United States Patent Office 3,507,202
Patented Apr. 21, 1970

3,507,202
PHOTOGRAPHIC CURTAIN-TYPE SHUTTER
Claus Prochnow, Braunschweig, Germany, assignor to Rollei-Werke Franke & Heidecke, Braunschweig, Germany, a firm of Germany
Filed Aug. 25, 1967, Ser. No. 667,029
Claims priority, application Germany, Aug. 27, 1966, R 44,009
Int. Cl. G03b 9/28
U.S. Cl. 95—57       7 Claims

ABSTRACT OF THE DISCLOSURE

A focal plane shutter of the two-curtain type with separate latches to hold the two curtains in a tensioned or cocked position. A spring powered actuating mechanism, independent of the springs which drive the curtains, releases first one latch, to start the movement of the first curtain, and then the second latch, to start the movement of the second curtain. The second latch is released after the first latch, depending upon the desired length of exposure and independently of movement of the first curtain.

---

The invention relates to curtain-type shutters in which the curtains, provided with separate spring mechanisms, are released successively for independent running-off.

A conventional roller blind focal plane shutter has two roller blinds each one with a wind-up and a wind-off pulley so that one pair of pulleys must be available at each end of the picture area. In order to set the shutter the roller blinds are wound on the other pair of pulleys thus tensioning springs which are placed in the pair of pulleys at the opposite end of the picture gate. When the shutter starts the roller blinds are returning to their original pulleys.

When running off the roller blinds rims are more or less off-set so that a slot is formed between them for light transmission. The width of the slot may be kept constant when running off. With other known roller blind shutters the width of the slot is varying in consideration of the fact that the run-off speed of the roller blinds is not steady (acceleration on the start and retardation when the shutter is running out) and finally there exist focal plane shutters, the two roller blinds of which run off independently one of the other; it is to this latter category that the shutter as per the present application is belonging to.

It is known to actuate the run-off catch of the second curtain by means of the curtain which runs-off first. In this case however the uniform and rapid running-off of the first curtain must not be disturbed or in any way hindered. Moreover the slit width, that is to say the moment of release of the second curtain, should be adjustable by means of a knob which is non-displaceable, that is to say stationary in running-off. Due to this difficulties arise as regards the unhindered running-off of the first curtain. Even when these design conditions are taken into consideration it is difficult with such arrangements to obtain very small slit widths and accordingly very short exposure times.

According to the present invention there is provided a photographic shutter comprising two curtains, a spring mechanism for each curtain, a release pawl for each spring mechanism, a release lever, a release pawl actuating member, and a drive mechanism for driving the actuating member, which mechanism is operable independently of the spring mechanisms for the curtains, the actuating member being movable to a cocked position in which it can be held by the release lever, whereby when the release lever is moved to release the actuating member said member is driven by its drive mechanism to actuate the release pawls in succession.

The decisive advantage of such an arrangement is that the curtains after they have been released can run-off completely unhindered under the influence of their own spring mechanism, and that by an appropriate short cam sequence and an appropriate high running-off speed of the separate control mechanism, independent of the speed of the shutter curtains, apart from the ordinary slit widths it is also possible to achieve very small slit widths and thus, without difficulty, very short exposure times. The release cams can be fixedly arranged on the control mechanism; it is also possible for several cams to be provided, so that different slit widths can be obtained. A further advantage of the arrangement according to the invention consists in that with relatively low expense it permits the shutter to be provided with an escapement and with the apparatus for long-time exposures, and also permits substantial simplifications as regards flash synchronisation and the connection with other parts of the camera, for example the hinged mirror in mirror-reflex cameras, the spring diaphragm.

A constructional embodiment of the invention will now be described, by way of example, with reference to the accompanying drawings, wherein.

Figure 3:
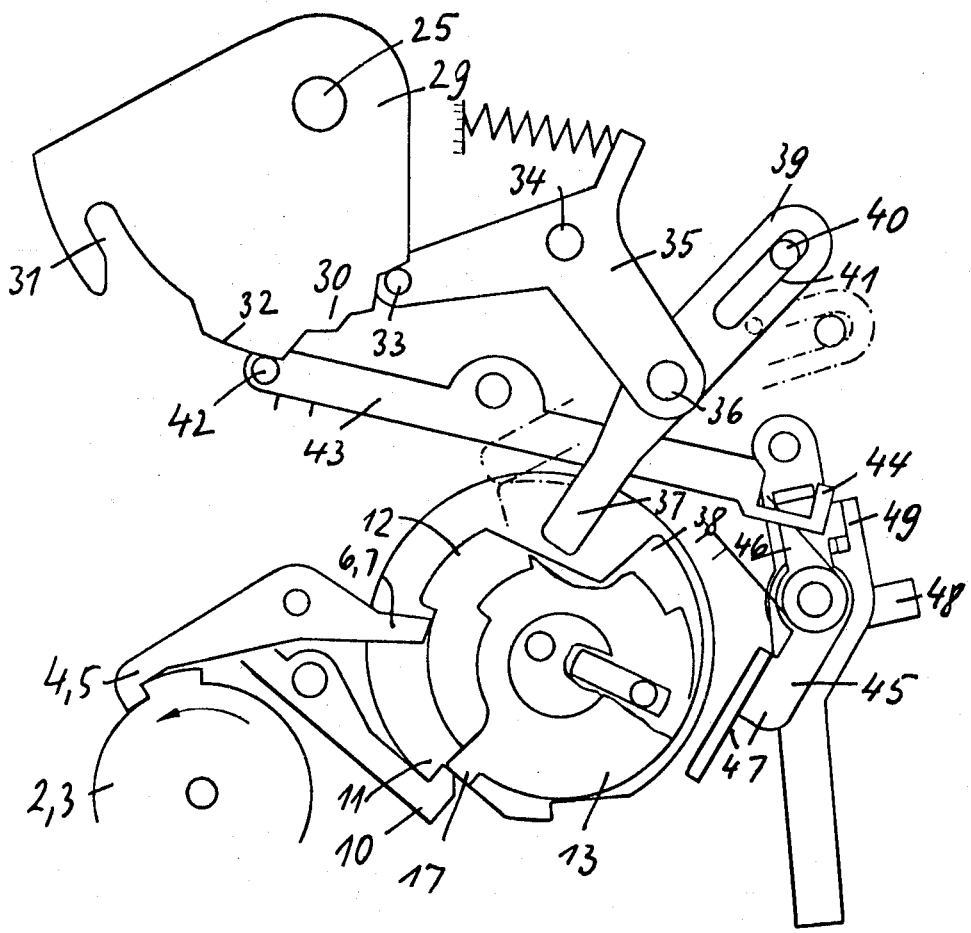

FIGURE 3 with the escapement effective; and

Figure 4:
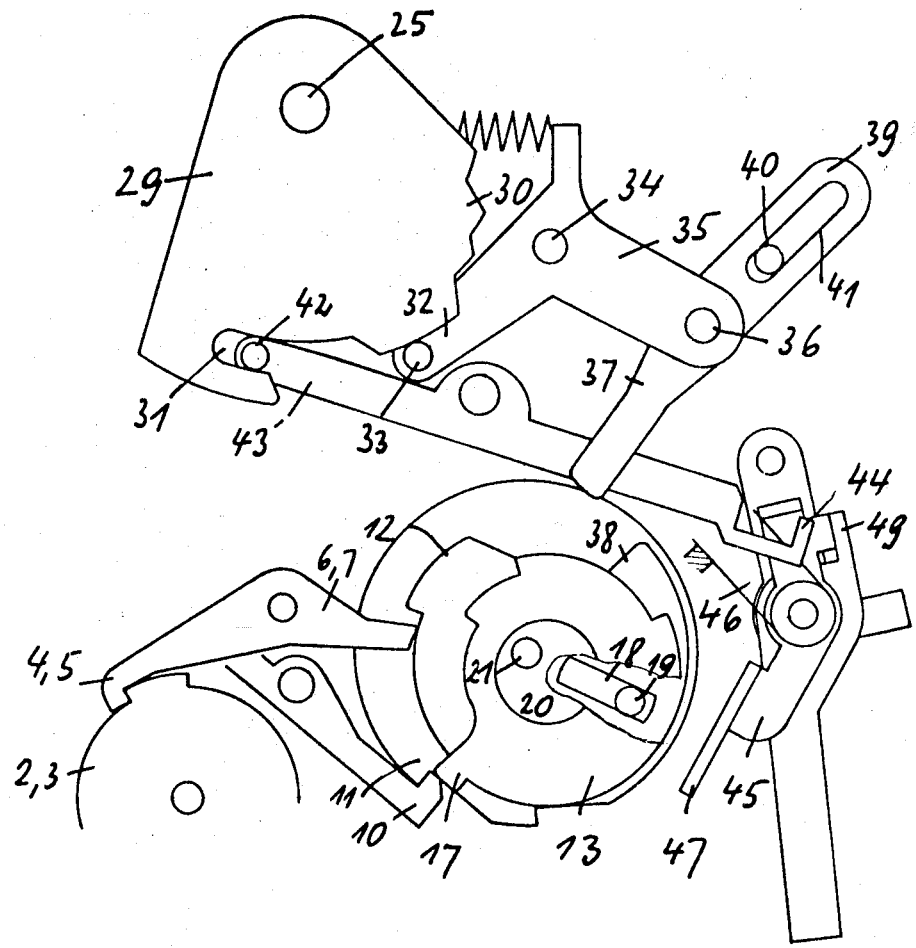

FIGURE 4 shows the drive mechanism parts effective in the case of "B" exposure.

The conventional roller curtains on the spindle 1, shown schematically at 62 and 63, are wound up on conventional wind-up rollers on the spindle 1 in known manner with stressing of their run-off springs, schematically shown at 64 and 65, respectively. The wind-up rollers of the curtains 62 and 63, respectively, are provided with pawl discs 2 and 3 respectively, which are held by pawls 4 and 5 respectively, in the cocked position of the shutter. One pawl lies behind the other, and their outlines are identical, so that in the drawings only the nearer pawl 5 and its tail 7 are visible, the parts 4 and 6 being hidden. The ends 6 and 7 of the pawls 4, 5 rotatable about the peg 8 lie adjacent cam discs of a separate mechanism 9, for example a spring housing, which can be wound up in common with the roller curtains e.g. by a differential gearing. A pawl 10 and pawl disc 11 hold the spring mechanism 9 in the cocked position, against the force of any conventional spring such as schematically shown at 91, which tends to turn the mechanism 9 counterclockwise. A cam disc 12 is rigidly connected with the disc 11 and lies in the same plane as the pawl end 6 of the run-off pawl 4 of the first curtain.

A further cam disc 13 having several cams 14, 15, 16, 17 lies in the plane of the pawl end 7 of the run-off pawl 5 of the second curtain. This cam disc 13 is connected in the direction of rotation with the cam disc 12 by a slot-pin connection 18, 19. The pin 19 projects from the rear side of the disc 13 and the slot 18 is formed in the disc 12.

The cam disk is rotatble about an eccentric 20 which in turn is rotatable coaxially about the common spindle 21 of the spring housing 9 and the cam discs 11 and 12. The angular distance of the cams 14, 15, 16, 17 from the cam of the disc 12 remains constant, but the disc 13 in running-off carries out a wobbling movement on its eccentric in the direction of the slot 18, so that according to the position of the eccentric 20 one of the cams 14, 15, 16, 17 comes so far radially outwards that it can actuate the pawl 7. According to the position of the eccentric 20 thus one of these four cams 14, 15, 16, 17 releases the pawl 7. The adjustment of the eccentric is effected by a toothed segment lever 22 through the toothed segment 23 and the pinion segment 23a, which is seated on the eccentric 20. The lever 22 is controlled by a cam disc 24 on the shaft 25. As long as the pin 26 runs on the concentric circle 27 of the disc 24, no variation occurs. When however the pin 26 enters the stepped groove 28, the eccentric is rotated step by step by means of the eccentric disc 20, so that the four steps 14, 15, 16, 17 of the cam disc 13 are transferred successively into the effective position.

Figure 1:
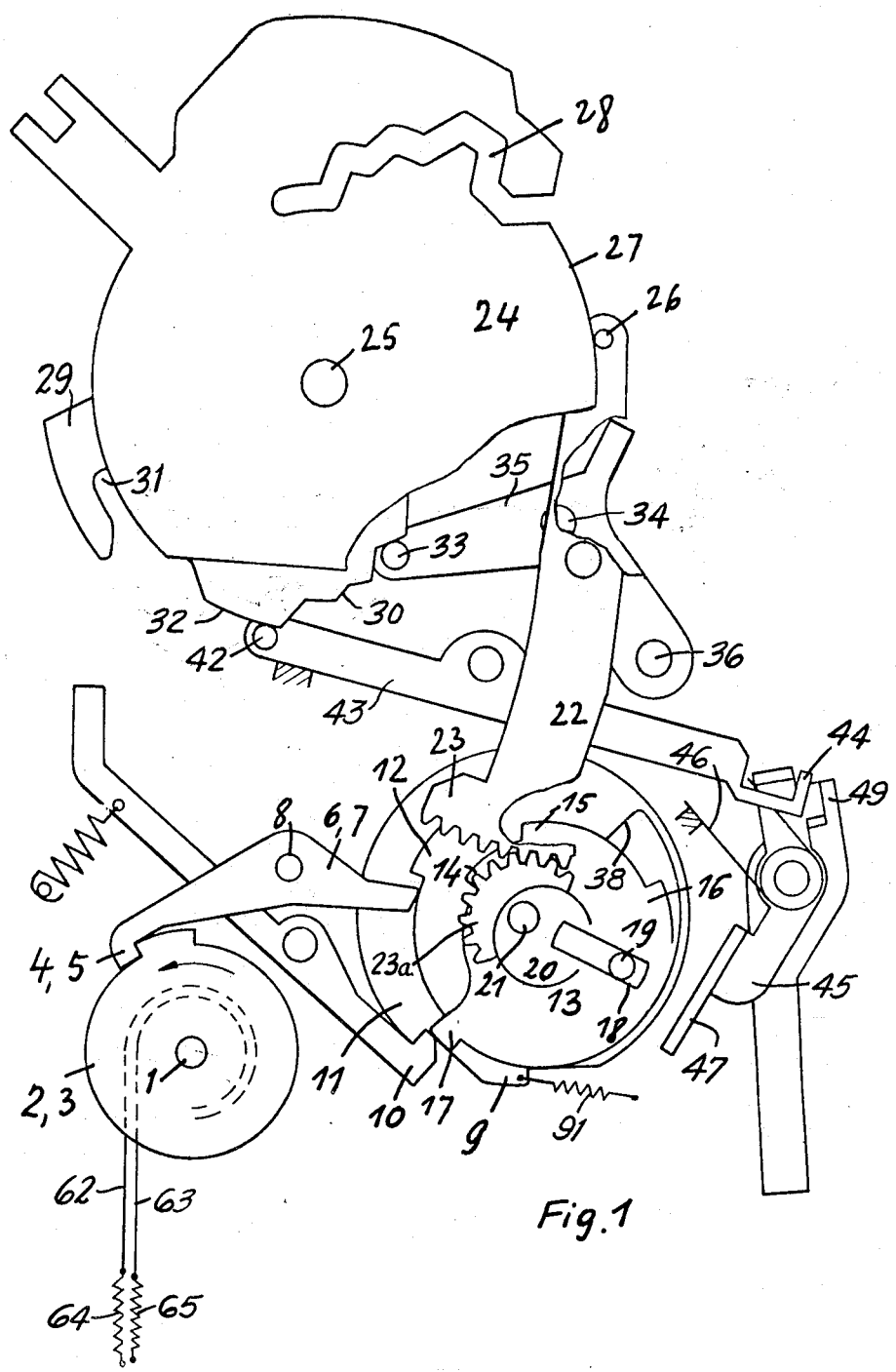
FIGURE 1 shows the drive mechanism parts participating in the slot formation with the shutter ready to run-off.

The release of the shutter is manually operated by means of a push button on the camera which actuates the lever in the right-hand bottom of FIGURE 1. The latter causes first the release of the reflex mirror so that it will be turned upwards, and the tightening of the lens diaphragm on the set value, then the release pawl 10 is actuated by a connecting rod by said lever. On actuation of the release pawl 10 the drive mechanism 9 runs-off, whereby firstly the cam 12 releases the pawl 4 and releases the first curtain to run-off. According to the position of the eccentric then one of the four cams 14, 15, 16, 17 comes into engagement with the pawl end 7, whereby the second curtain is released. In the embodiment shown in FIG. 1, the cam 17 is situated in the effective position, so that this illustrated position corresponds to the maximum slit width, because only the last cam 17 can actuate the pawl 7. In the opposite eccentric position the cam 14 would become effective, so that directly after liberation of the first curtain the cam 14 can actuate the pawl 7, 5 and liberate the second curtain. Thus this position corresponds to the minimum slit width. In the embodiment shown in FIG. 1 four different slit widths are provided. The absolute slit width depends however not only upon the distance of the cams 14, 15, 16, 17 from the pawl 7 alone, but upon the running-off speed of the drive mechanism 9.

It is obvious that in the known devices where the run-off catch of the second curtain is controlled by the curtain which runs-off first, the running-off speed of the first curtain is decisive for the slit formation and cannot be increased beyond the limit given by this running-off speed of the first curtain. In the shutter according to the invention on the other hand the running-off speed, that is to say the chronological succession of the release operation by the cam 12 and the next succeeding cam 14 of the release disc 13 of the second shutter can be shortened considerably by increased speed of the running mechanism, so that with the apparatus according to the invention smaller slit widths and very much shorter exposure times become possible. Obviously it is possible in place of the four-stepped disc 13 to provide a disc with less or more steps, but in practice a division into four steps is sufficient, while for the first step 14 the smallest possible angular distance from the release cam 12 is to be sought. On the shaft 25 of the cam disc 27 there is a further cam disc 29 with a stepped graduation 30 and a catch groove 31.

The shaft 25 is rigidly connected with the disks 24 and 29 and joint with a setting knob which indicates the exposure time. The exposure time results from the width of the slot and therefrom the start of the second blind after the first blind did run off. For short exposure times the start of the second blind is effected by adjusting the cam disc 14, 15, 16, 17 which on its part is controlled by the cam plate 24 through the lever 22 and the gear drive 23, 23a.

The peripheral part 32 lying between the two lies concentrically of the rotation shaft 25. The mutual position of the cam discs 27 and 29 on the shaft 25 is selected so that the peg 33 slides on the concentric surface 32, as long as the peg 26 is situated in the cam groove 28, that is to say the bell crank lever 35 rotatable about the peg 34 lies in the outermost position pivoted in the anti-clockwise direction. When the peg 26 is in the lowest position of the groove 28, the cam 14 is effective, that is to say the smallest slit width is set. With progressive rotation of the disc 27 in the anti-clockwise direction the cams 15, 16 and 17 come into action, that is to say the wider slit widths are set. When the cam 17 becomes effective the pin 26 slides out of the groove 28 on to the concentric periphery of the cam disc 27. On further rotation the peg 33 comes on to the steps 30 of the cam disc 29, whereby the lever 35 can pivot in step by step in the clockwise direction; thus the double lever pivotable on its peg 36 comes with its end 37 more or less into the region of the shoulder 38 of the cam disc 12 and hinders its running-off. At the other end of the lever 37 the peg 40 of an escapement engages in a pin-slot connection 41. This arrangement achieves the object that in the position as illustrated, that is when the escapement is effective, on release of the release catch 10 firstly the run-off catch 6 of the first curtain is released by the cam 12, whereupon before the cam 17 for the second curtain becomes effective the running-off of the drive mechanism is hindered by abutment of the shoulder 38 on the lever 37, until the running-off pre-timer mechanism permits the escape of the lever 37 from the disc 12. Thereupon the cam 17 can release the second curtain.

Figure 2:
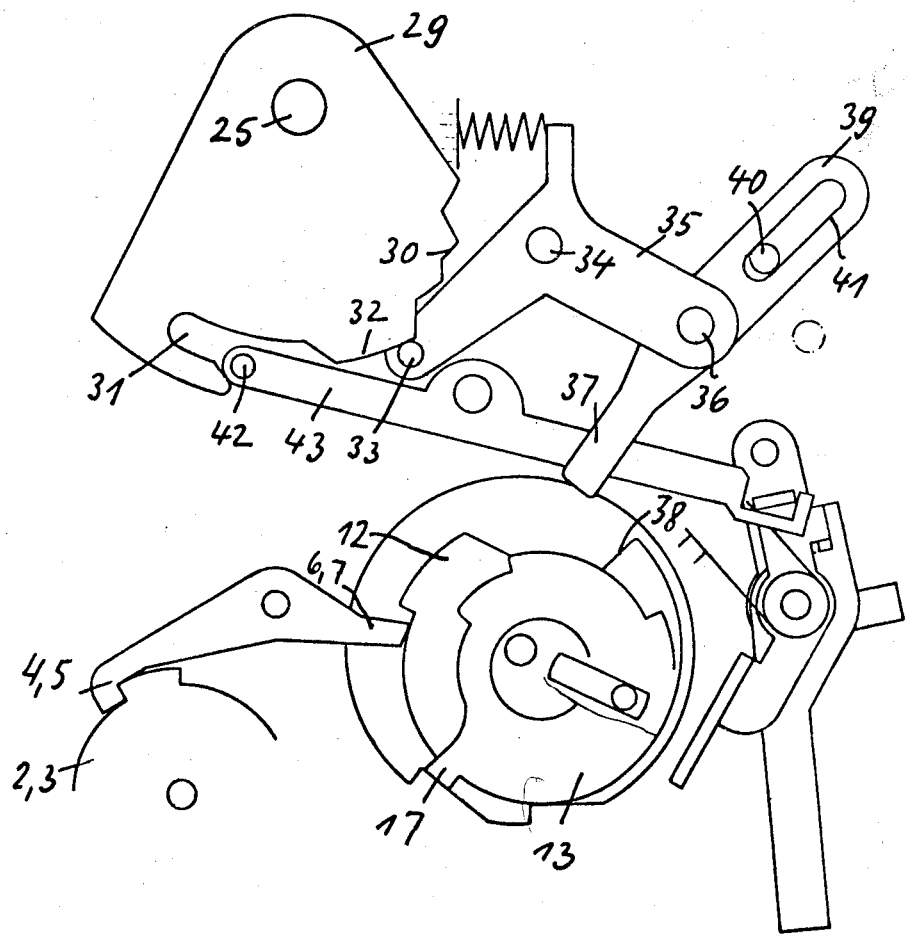
FIGURE 2 shows the escapement control for the formation of longer exposure times with the escapement ineffective.

In the case of longer exposure times the start of the second blind, i.e. the disks 11, 12, 13, is controlled by the escapement lever 17, namely by the cam plate 29. The discontinuity of the curve 28 just results from the very fact that the start of the second blind at short exposure times of $\frac{1}{500}$ to $\frac{1}{60}$ sec. is only controlled by the curve 28, the smallest width of the slot corresponding with the shortest exposure time of $\frac{1}{500}$ sec. and the largest width of the slot with that of $\frac{1}{60}$ sec. This position of the curve plate 13 which is determinative for $\frac{1}{60}$ sec, is also maintained for the longer exposure times $\frac{1}{15}$, $\frac{1}{8}$ sec. ect., i.e. the start of the second blind will be released as soon as the width of slot corresponding $\frac{1}{60}$ sec. is reached, but it will be delayed furthermore by the escapement until that width of the slot is obtained which corresponds to the longer exposure time. In order to get a strict setting of the slot in the transition zone, i.e. for instance for $\frac{1}{30}$ sec, in this case there is already made use of the efficacy of the escapement, i.e. the curve 30 is already made effective, but on the other hand it is not the curve 27 which is used for setting the disk 13, but part of the curve 28 which in itself corresponds to a shorter exposure time of $\frac{1}{25}$ or $\frac{1}{250}$ sec. This means that in the transition zone (in the present case $\frac{1}{30}$ sec.) cam 28 as well as cam 30 are used. By practical experience it has been revealed that an abrupt passing over from curve 28 to curve 30 would impair the width of the slot and the achievement of the exact value of the exposure time. In the case of this arrangement or adjustment of the stepped discs 29 for the setting of various escapement times, the drive peg 40 of the escapement always remains in the same basic position, so that at all escapement times the same start conditions are given for the escapements; the lever arm 37 dipping into the region of the shoulder 38 also remains practically always radial, so that rebounds and thus inaccurate escapement effects are avoided. On further rotation of the shaft 25 with the cam discs 27 and 29 finally the peg 33 comes on to the concentric face 32, whereby the escapement becomes ineffective, and finally into an end position in which the catch groove 31 draws the peg 42 of a lever 43 radially inwards. This position is illustrated in FIGURE 4. It corresponds to the "B" exposure that is to say in which on release of the shutter the running-off of the second curtain is hindered after opening of the shutter by the release itself as long as the release is pressed. In this position the end 44 of the lever 43 liberate the lever 45, so that the latter becomes free under the influence of a spring 46. When the curve plates 29 and 24 are turned counterclockwise as far as to occupy the position as per FIGURE 4, curve 28 as well as curve 30 are ineffective. Until then the pawl 45, 47 was kept in its position as per FIGURES 1, 2, and 3 by the fork 44 so that it remain fixed when the reelase was operated. In the position as per FIGURE 4, this pawl has now been released by the fork 44 so that when operating the release knob, lever at the right-hand bottom side, this pawl will follow this release knob by corresponding spring tension so that the stop 47 will enter the way of the cam disk 12 of the second blind. The first blind can run off as usually. The start of the second blind is therefore prevented as long as the release is pressed, only when the release is loosed and the stop 47 also removed to the right, the second blind can run off thus closing the shutter.

The escapement is only marked by the clutch pin 40. During the shutter travel time the curve rim 38 presses the escapement 37 outwards whereby the curve 41 must drive the pin 40 of the escapement. The escapement offers a corresponding drag against this motion and after the exposure the parts return to their inoperative position, since the escapement has a pertinent resetting spring with a by-pass clutch. This is an entirely normal escapement design as it is prior art.

What I claim is:

1. A photographic shutter comprising two curtains, a spring mechanism for each curtain, a release pawl for each spring mechanism, a release lever, a release pawl actuating member, and a drive mechanism for driving the actuating member, which mechanism is operable independently of the spring mechanisms for the curtains, the actuating member being movable to a cocked position in which it can be held by the release lever, whereby when the release lever is moved to release the actuating member said member is driven by its drive mechanism to actuate the release pawls in succession.

2. A shutter as claimed in claim 1, wherein the drive mechanism for the actuating member is a spring mechanism.

3. A shutter as claimed in claim 1, wherein the release pawl actuating member comprises a release disc having a notch engageable by the release member, a first cam disc mounted on a spindle with said release disc for engaging the release pawl for the first curtain and a second cam disc for engaging the release pawl for the second curtain, the second cam disc having a plurality of radially offset cams and being eccentrically mounted on said spindle and rotatable relative to the first cam disc so as to bring the required cam into an operative position.

4. A shutter as claimed in claim 3, wherein a toothed segment is fixed to the second cam disc and is engaged by a toothed segment on one of a pivotable mounted lever the other end of which engages the eccentric periphery of a control disc mounted on a shaft.

5. A shutter as claimed in claim 4, wherein a cam segment is mounted on said shaft which segment has a stepped face engaged by a device for delaying operation of the second curtain for a certain time depending on the step of the segment engaged by the device, the segment having a cam which acts on a catch when the segment is rotated to a certain position so that the catch acts on a mechanism which prevents operation of the second curtain while the release lever is depressed.

6. A shutter as claimed in claim 5, wherein the device comprises a pivotable lever one end of which comprises a stop for engaging the first cam disc and the other end of which has a slot engaged by a pin of an escapement, the pivot of the pivotable lever being carried by the free end of one arm of a bell-crank lever, the free end of the other arm of which carries a peg which runs on the cam segment.

7. A shutter as claimed in claim 6, wherein the cam segment and control disc are mounted on said spindle so that upon rotation of said spindle the segment and disc effect successively the setting of the second cam, the setting of the device for delaying operation of the second curtain and the setting of the mechanism, which prevents operation of the second curtain while the release lever is depressed.

References Cited

UNITED STATES PATENTS

| | | | |
|---|---|---|---|
| 2,928,326 | 3/1960 | Loose | 95—57 |
| 3,029,721 | 4/1962 | Muller | 95—57 |
| 3,256,795 | 6/1966 | Padelt | 95—57 |

NORTON ANSHER, Primary Examiner

L. H. McCORMICK, Jr., Assistant Examiner